United States Patent [19]

Strait

[11] Patent Number: 4,842,452
[45] Date of Patent: Jun. 27, 1989

[54] SURFACING MACHINE

[75] Inventor: David S. Strait, Newberg, Oreg.

[73] Assignee: Climax Portable Machine Tools, Inc., Newberg, Oreg.

[21] Appl. No.: 124,038

[22] Filed: Nov. 23, 1987

Related U.S. Application Data

[63] Continuation-in-part of Ser. No. 108,542, Oct. 14, 1987.

[51] Int. Cl.$^4$ .............................................. B23B 41/00
[52] U.S. Cl. ......................................... 408/80; 408/16; 408/83.5
[58] Field of Search ............................. 408/16, 80–83, 408/83.5

[56] References Cited

U.S. PATENT DOCUMENTS

| | | | |
|---|---|---|---|
| 1,859,837 | 5/1932 | Moen | 408/83.5 |
| 1,905,819 | 6/1933 | Doyle | 408/83.5 |
| 3,331,266 | 7/1967 | Brooks | 408/80 |
| 4,007,561 | 2/1977 | Okano et al. | 51/241 US |
| 4,050,836 | 9/1977 | Anders | 408/80 X |
| 4,106,880 | 8/1978 | Anders | 408/1 R |
| 4,175,471 | 11/1979 | Wilger et al. | 408/83.5 |
| 4,571,129 | 2/1986 | Strand | 408/54 |
| 4,678,379 | 7/1987 | Sunday | 408/83.5 |

FOREIGN PATENT DOCUMENTS 198194  5/1908  Fed. Rep. of Germany ........ 408/83

Primary Examiner—Eugene F. Desmond
Attorney, Agent, or Firm—Dellett, Smith-Hill and Bedell

[57] ABSTRACT

A surfacing machine mountable within a valve body includes a tubular turning bar supported by chucks engaging the valve body and having independently adjustable legs and a bearing arrangement which permits rotational and axial movement of the turning bar relative to the chucks. Hoses and control rods are routed through the tubular turning bar to a removable tool head which may be accessed when deep within the valve body. The arrangement facilitates both visual and physical access to the work site such that an operator may exchange tool heads to switch surfacing operations without changing the mounting alignment of the surfacing machine within the valve body.

24 Claims, 8 Drawing Sheets

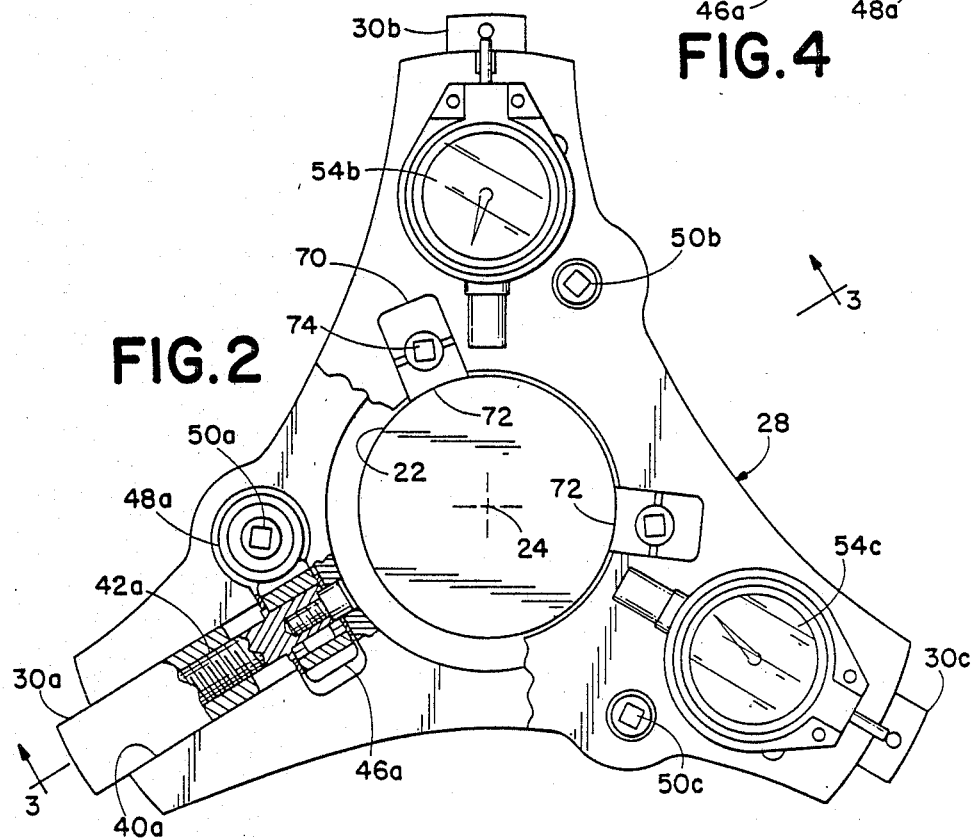
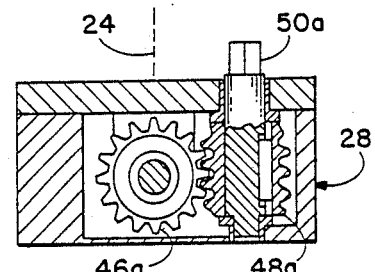
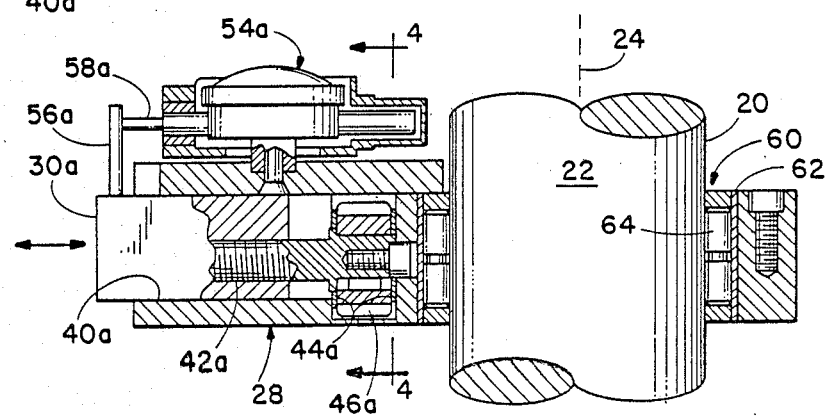

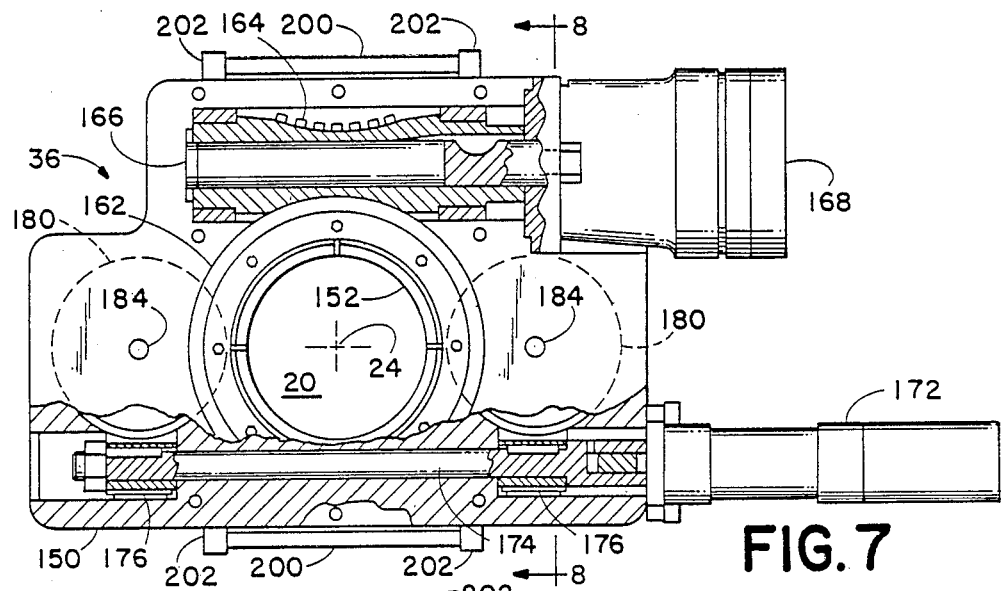
FIG. 7
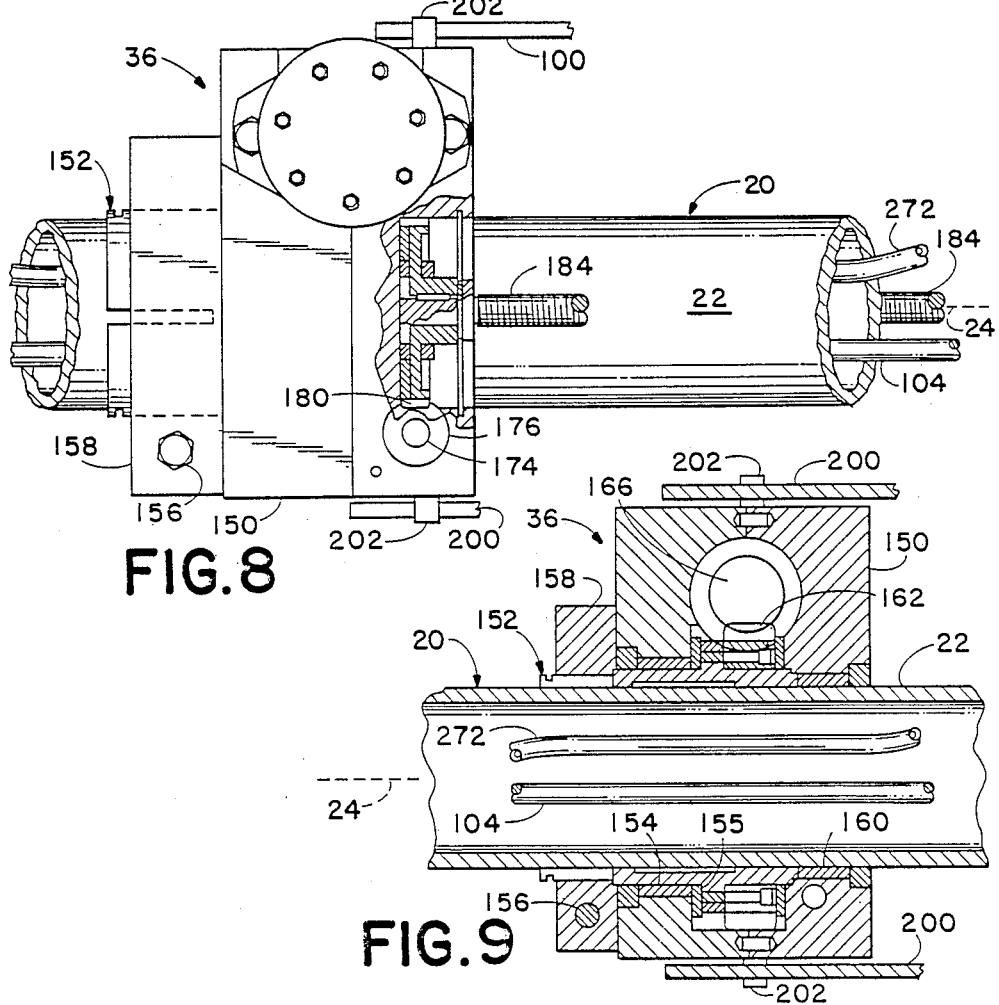
FIG. 8
FIG. 9

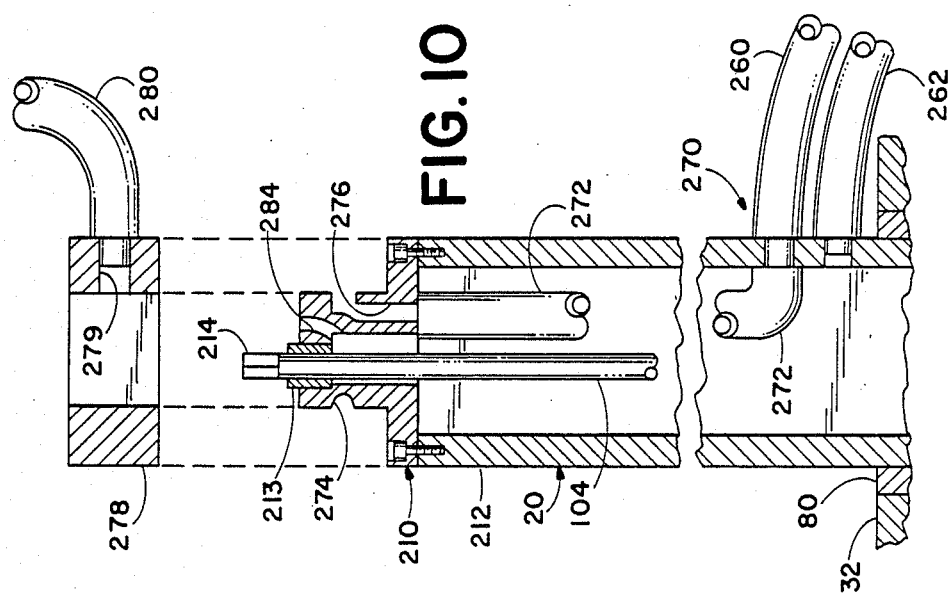
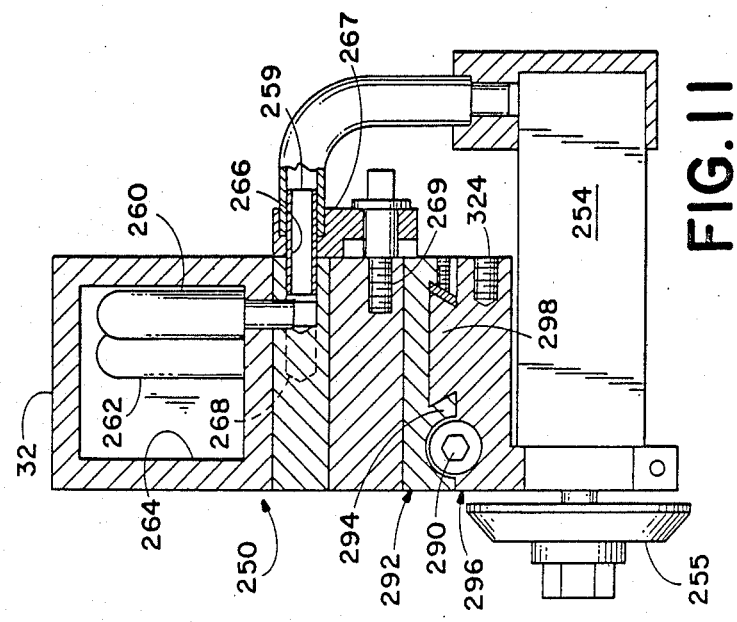

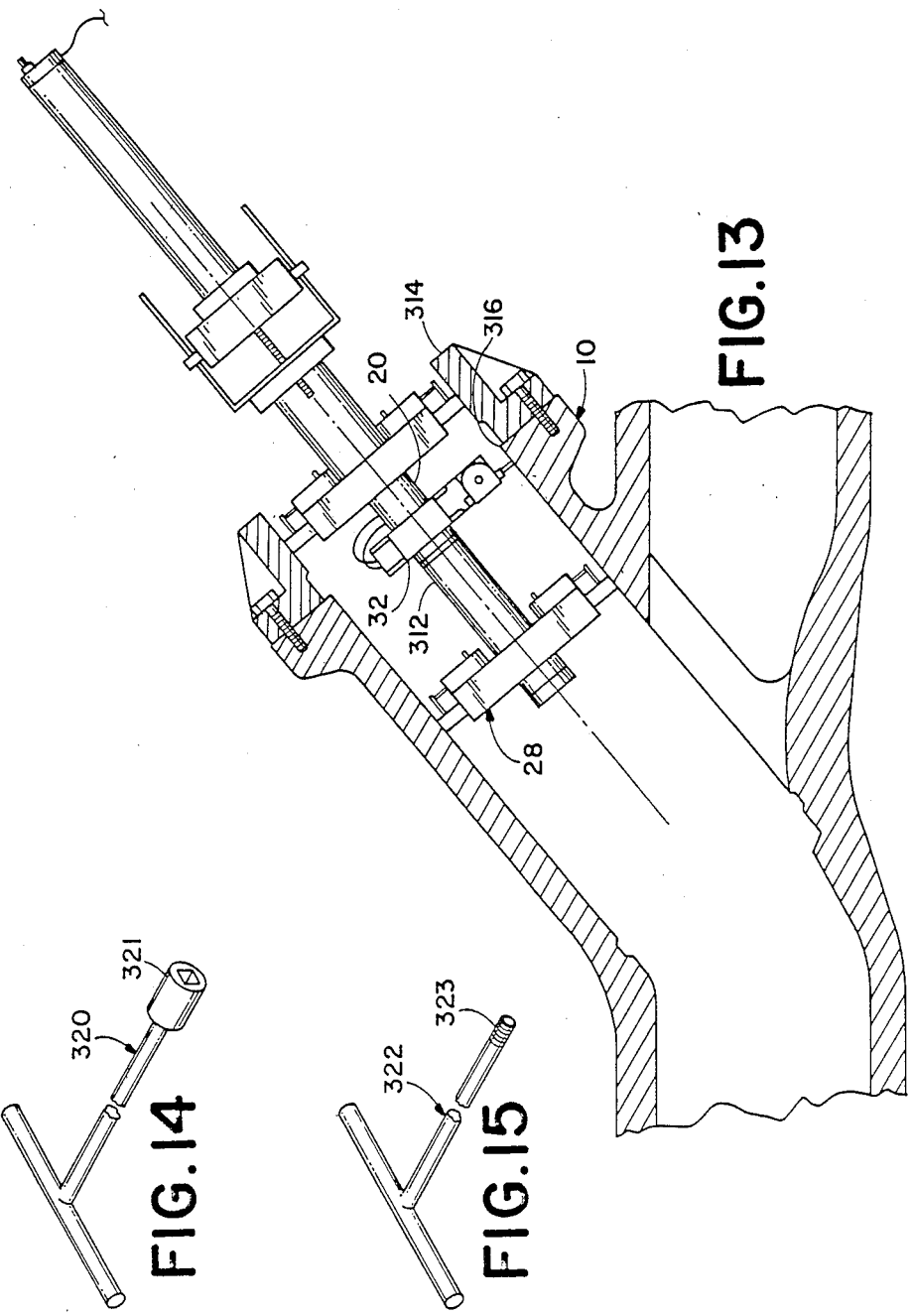

SURFACING MACHINE

CROSS REFERENCE TO RELATED APPLICATIONS

This application is a continuation-in-part of my co-pending application Ser. No. 108,542 filed Oct. 14, 1987, for BEARING ARRANGEMENT FOR A ROTATABLE TURNING BAR.

BACKGROUND OF THE INVENTION

This invention relates to surfacing machines.

Surfacing machines which are mounted within a workpiece, such as a large valve or the like, typically cannot accurately repeat a given mount. This is critical when the operator must mount and dismount the machine to change surfacing tools in the course of a surfacing operation because of an inability to access a tool head disposed deep within the workpiece. Initially, the machine is mounted and aligned relative to a portion of the workpiece to be surfaced and a cutting operation is performed. The machine is then dismounted in order to attach a grinding tool and is remounted, as close to the initial mount as possible, to perform a grinding operation. Misalignment relative to the initial mount requires that the grinding operation first work the surface to conform to the new mounting alignment and the net result is that an excessive amount of material is removed due to the misalignment. Many prior art devices require special mounting surfaces integral to the workpiece, i.e. the valve body, and are often limited to special surfacing operations, such as valve seat resurfacing.

SUMMARY OF THE INVENTION

A surfacing machine utilizing a central tubular turning bar having a tool support arm mountable on the bar and a drive mechanism mounted on the bar provides improved visual and physical access to a work site at the interior of a workpiece, such as a valve body, when the surfacing machine is mounted within the workpiece. Hoses and control rods are routed through the tubular turning bar to the tool head to provide power to and radial positioning of various tool heads mountable on the tool support arm. Support chucks are mountable to the workpiece and include bearing elements which ride directly on the exterior surface of the turning bar and allow for rotational and axial movement of the turning bar. Each support chuck includes radially extendable legs for contacting the workpiece wherein each leg is individually adjustable and a separate distance gauge is used to measure its radial position to aid in aligning the surfacing machine relative to the workpiece. The drive mechanism is mountable along the length of the turning bar and includes a rotational drive motor coupled to the turning bar. The drive mechanism is held against all but axial movement relative to the support chucks such that operation of the motor causes the turning bar to rotate relative to the chucks. Axial positioning of the tool support arm is permitted by movement of the drive mechanism relative to the support chucks.

BRIEF DESCRIPTION OF THE DRAWINGS

For a better understanding of the invention, and to show how the same may be carried into effect, reference will now be made, by way of example, to the accompanying drawings in which:

FIG. 2 is a top view partially cut away of a support chuck of the machine of FIG. 1;

FIG. 3 shows a bearing arrangement of the support chuck of FIG. 2 which provides rotatable support while allowing axial movement of a turning bar;

FIG. 4 is a partial cut away view of the support chuck of FIG. 2;

FIGS. 7, 8 and 9 illustrate a rotational and axial drive mechanism of the machine of FIG. 1;

FIG. 10 is a sectional view of the turning bar which illustrates a rotary union and the placement of a hose and a control rod within the turning bar;

FIGS. 11 and 12 are sectional views of the tool support arm with a grinding tool head assembly attached thereto;

FIG. 13 depicts use of additional components used in connection with the machine of FIG. 1; and FIGS. 14 and 15 illustrate extension tools used in connection with the surfacing machine.

DETAILED DESCRIPTION

Figure 1:
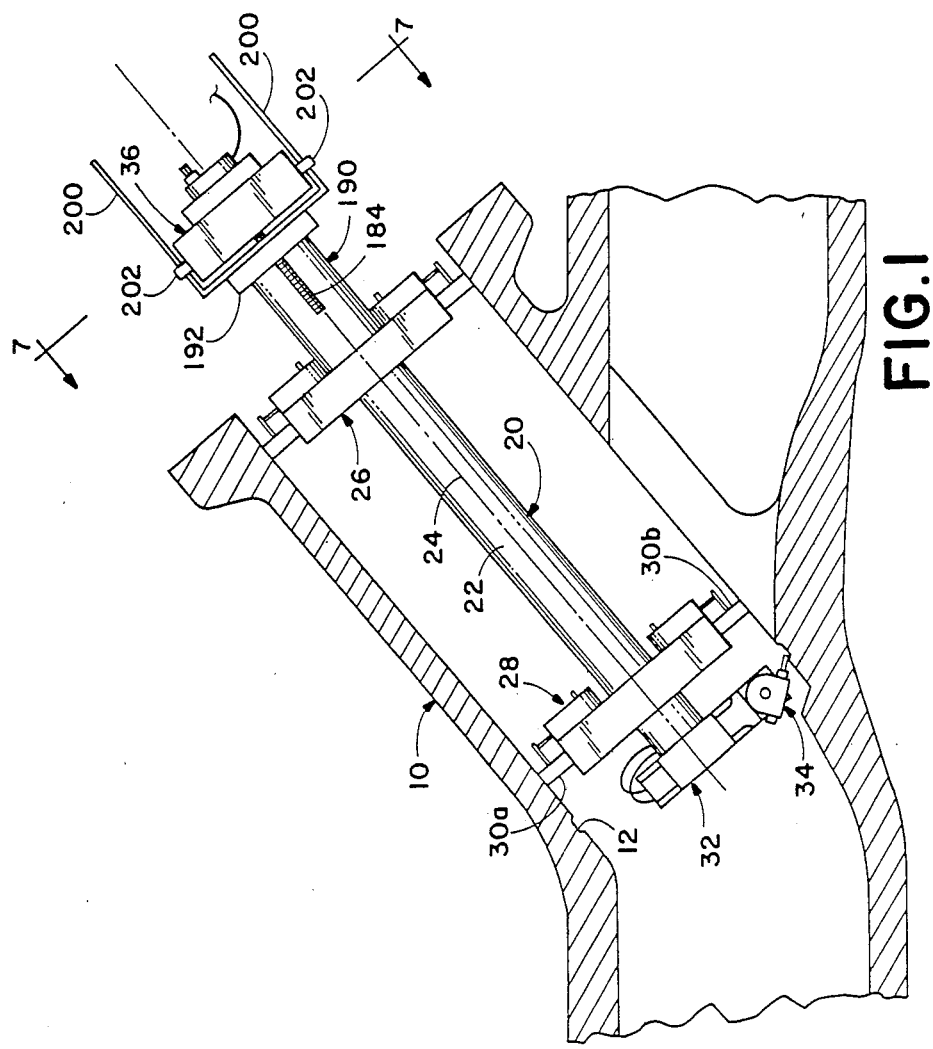
FIG. 1 is a side view partially cut away of a surfacing machine in accordance with the invention mounted within a valve body.

FIG. 1 shows a surfacing machine in accordance with the invention mounted within a valve body 10 for surfacing a valve seat 12. A turning bar 20, having an external surface 22 of circular crosssection defining a central axis 24, is rotatably supported within the valve body 18 by an upper support chuck 26 and a lower support chuck 28, each support chuck engaging the valve body 10 for mounting the surfacing machine therein. A tool support arm 32 is mounted at one end of the turning bar 20 and carries a removable tool head assembly 34 while a rotational and axial drive mechanism 36 is positioned at an opposite end of the turning bar 20 for providing the bar 20 with rotational and axial movement about and along the axis 24 relative to the support chucks 26 and 28.

FIGS. 2–4 further illustrate the lower support chuck 28 wherein a leg 30a is radially slidable with respect to the axis 24 within a cavity 40a (FIGS. 2 and 3) formed in the support chuck 28, the leg 30a and cavity 40a each having a square cross section for preventing rotation of leg 30a within the cavity 40a. Radial positioning of leg 30a is accomplished by rotation of screw 42a threadably engaged within leg 30a and held against radial movement relative to the axis 24 by thrust washers 44a. As shown in FIG. 4, the screw 42a includes a worm gear 46a meshed with a worm 48a rotationally disposed within chuck 28, the worm 48a having a nut 50a for rotation thereof. Thus, rotation of nut 50a in one direction causes leg 30a to be advanced radially outward with respect to axis 24 while rotation of nut 50a in the opposite direction results in radial retraction of the leg 30a relative to the axis 24.

A distance gauge 54a (FIG. 3) indicates the radial extension of leg 30a with respect to the axis 24 by means of pin 56a affixed to leg 30a and contacting a sensing rod 58a of gauge 54a, the rod 58a being spring biased radially outward with respect to the axis 24. As leg 30a is moved radially, the sensing rod 58a follows the pin 56a such that the gauge 54a provides a measure of the radial position of the leg 309a. Gauge 54a may be reset to zero when leg 30a is at an arbitrary radial position, for example when it engages a reference surface at a predetermined radial distance from the external surface 22 of the turning bar 20.

The lower support chuck 28 further includes radially extendable legs 30b and 30c and corresponding gauges 54b and 54c individually operated by rotation of nuts 50b and 50c, respectively, in similar fashion to that of leg 30a and gauge 54a. Also, the upper support chuck 26 includes three radially extendable legs and corresponding gauges each similar to leg 30a and gauge 54a and individually operable by rotation of separate nuts.

The support chuck 28 includes a bearing arrangement 60 (FIG. 3) which rotatably supports the turning bar 20 while allowing axial movement of the turning bar 20. More particularly, the bearing arrangement 60 comprises an outer bearing race 62 affixed to the chuck 28 and needle roller bearings 64 captive between the outer bearing race 62 and the external surface 22 of the turning bar 20. The needle bearings 64 are rotatable about axes of rotation parallel to the central axis 24. The surface 22 is suitably hardened and forms an inner race for the bearings 64. To provide the turning bar 20 with maximum alignment stability within the support chuck 28, the needle bearings 64 are in a preloaded condition between the race 62 and the turning bar 20. The turning bar 20 is thus permitted to both rotate about and translate along its central axis 24 relative to the support chuck 28, which is thereby conveniently positionable along the length of the turning bar 20.

The turning bar 20 may be temporarily locked in position relative to the chuck 28 by split lock bars 70 (FIG. 2) affixed to the chuck 28, each of the lock bars 70 having a surface 72 adjacent and generally parallel to the surface 22 of the turning bar 20. Lugs 74, each threadable within a corresponding one of the lock bars 70, are employed to urge the corresponding surface 72 against the surface 22 of the turning bar 20 with sufficient force to prevent rotational and axial movement of the turning bar 20 with respect to the chuck 28.

The chuck 26 has a bearing arrangement similar to the bearing arrangement 60 of chuck 28 and a set of lock bars similar to the lock bars 70 of the chuck 28.

The tool support arm 32 is coupled to the bar 20 by a split-clamp mounting block 80 (FIG. 5) having an aperture 82 adjustable in diameter for receiving the turning bar 20 while bolts 84 close the aperture 82 upon the turning bar 20 to tightly secure the tool support arm 32 on the turning bar 20. The tool support arm 32 is formed with a dovetail 86 slidable in a mortise 85 of the mounting block 80. Set screws 88 secure the tool support arm against sliding movement relative to the mounting block during machine operation and are releasable to provide gross adjustments in the radial positioning of the tool head assembly 34 With respect to the central axis 24.

The tool head assembly 34 carries a cutting tool 90 on a rack 92 (FIGS. 5 and 6) driven radially with respect to the central axis 24 by a pinion 94 rotatably disposed within the tool head assembly 34. Pinion 94 is coupled to worm gear 96 meshed with a worm 98 rotatably mounted in the tool head assembly 34 such that rotation of the worm 98 effects radial positioning of the rack 92. A block 100 mounted interiorly of the tubular turning bar 20 by bolts 101 supports a worm 102 rotatable by means of a radial feed rod 104 rotatably disposed longitudinally within the turning bar 20. The worm 102 is employed to rotate a worm gear 106 within the block 100. A hexagonal rod 108, slidable along and rotatable about an axis 109, is slidable within a hexagonal aperture of the worm gear 106 and slidably engageable with the worm 98 at a dis-engageable connection 110. When the rod 108 is inserted in the connection 110, rotation of the radial feed rod 104 is transmitted via worm 102, worm gear 106, rod 108, worm 98, worm gear 96 and pinion 94 for radial positioning of the tool 90. Removal of the rod 108 from the connection 110 disengages radial feeding of the tool 90.

A radial engagement mechanism 112 is mounted on the block 80 and is used to slide the rod 108 in and out of the connection 110 for coupling and decoupling the tool head assembly 34 from radial feeding. To this end, a rotatable shaft 114 includes an eccentric pin 116 radially spaced from a rotational axis 118 of the shaft 114. A clutch block 120 is affixed to the rod 108 and includes a channel 122, transverse to a plane containing rod 108, for receiving the eccentric pin 116. Rotation of the shaft 114 causes the eccentric pin 116 to urge the block 120 toward and away from the tool head assembly 34 and thereby engages and disengages the rod 108 at the connection 110. The shaft 114 is rotated by a nut 124.

The tool head assembly 34 includes a tool head 142 formed with a mortise 131 which receives a dovetail 130 of the tool support arm 32, the dovetail 130 and mortise 131 converging in an upward direction. A clamping plate 138 is attached by bolts 139 to the tool head 142 at its upper end. Thus, the tool head assembly 34 may be brought to rest on the tool support arm 32 and supported thereon by engagement of the mortise 131 with dovetail 130 and engagement of the plate 138 with the arm 32. A tool head lock screw 136, having a nut 137 and threadable within the tool support arm 32, secures the tool head assembly 34 on the tool support arm 32. The lock screw 136 is captive upon the clamping plate 138 between upper and lower thrust discs, but is rotatably disposed upon plate 138 such that rotation of lock screw 136 in the clockwise direction serves to press the tool head 34 onto the mortise 131, and rotation in the counterclockwise direction serves to lift the tool head 34 from the mortise 131.

A swivel tool head 140 (FIG. 5) of the tool head assembly 34, including the rack 92, is rotatable with respect to the tool head 142, including the worm 98 and dovetail 130, about an axis 144. A swivel lock nut 146 and swivel clamp 148 serve to lock the swivel tool head 140 with respect to the tool head 142 during operation of the surfacing machine and permit selective rotational positioning of the tool 90 about the axis 144 for changing the angle of cut with respect to the axis 24. This arrangement allows for swiveling of the tool 90 while maintaining connection 110 in position to receive the rod 108.

Drive mechanism 36 (FIGS. 7, 8 and 9) imparts both rotational and axial movement to the turning bar 20 about and along its central axis 24. The drive mechanism 36 includes a block 150 with a split ring collet 152 rotationally disposed therein upon roller bearings 154 and thrust bearings 155 (FIG. 9). A screw 156 and split ring clamp 158 are used to tighten the collet 152 about the turning bar 20. Thus, the bar 20 is rotatable with respect to the block 150 and the position of the drive mechanism 36 along the length of the bar 20 may be adjusted. Needle bearings 160 are mounted on the block 150 and contact the surface 22 to provide additional rotational support between the turning bar 20 and the block 150. The collet 152 is fitted with worm gear 162 meshed with worm 164 affixed to a rotational drive shaft 166 driven by a rotational drive motor 168. Operation of the rotational drive motor 168 causes the turning bar 20 to rotate about its central axis 24 relative to the block 150. A bi-directional axial drive motor 172 turns an axial drive shaft 174 having worms 176 axially spaced therealong for engagement with corresponding worm gears 180. Each of worm gears 180 is connected to a corresponding axial lead screw 184. Axial lead screws 184 are rotationally disposed in block 150 and extend toward the upper support chuck 26. Thus, the axial lead screws 184 are driven bi-directionally by the axial drive motor 172.

A tubular member 190 (FIG. 1) concentric to the turning bar 20 and affixed to the upper support chuck 26 extends from the upper support chuck toward the drive mechanism 36. The member 190 is provided with apertures (not shown) for permitting the lock bars 70 to be positioned adjacent the turning arm 20. Axial lead screws 184 are threadably engaged in an upper portion 192 of the support member 190 such that rotation of the axial lead screws 184 in one direction causes the turning bar 20 to move axially in one direction relative to the upper support chuck 26 while rotation of the axial lead screws 184 in the opposite direction moves the turning bar 20 in the opposite axial direction.

The drive mechanism 36 is held against rotation about the central axis 24 relative to the support chuck 26 by guide members 200 (FIGS. 1, 7, 8 and 9) secured to the tubular support 190. The guide members 200 are held between pegs 202, affixed to the block 150, which permit axial movement of the guide members 200 therebetween.

A cap 210 (FIG. 10) at an upper end 212 of the turning bar 20 is provided with a bearing 213 for rotational support of the radial feed rod 104. A radial feed nut 214 is provided at the upper end of the rod 104 for rotation thereof to perform radial positioning of the tool 90 relative to the central axis 24. The gearing ratios among the various gears coupling the nut 214 to the rack 92 may provide, for example, 0.127 mm radial movement of the rack 92 per revolution of the nut 214 relative to the turning bar 20. A fixed radial feed rate during machine operation is achieved by holding the radial feed nut 214 against rotation about its central axis with respect to the support chuck 26, while the turning bar 20 is rotated at a constant rate under the influence of the rotational drive motor 168.

A separate grinding tool head assembly 250 (FIGS. 11 and 12), comprising a tool head 292 and a slidable tool head 296, is mountable on the tool support arm 32 by means of a mortise 252 formed in the tool head 292. Mortise 252 is similar to mortise 131 of the tool head assembly 34. Grinding tool head assembly 250 also includes a clamping plate 267 and lock screw 269, similar to plate 138 and lock screw 136, respectively, of tool head assembly 34. The grinding tool head assembly 250 includes a pneumatic motor 254, for rotating a grinding wheel 255. The motor has an intake air hose 256 and an exhaust air hose 258, the air hoses 256 and 258 each having a nipple 259 at its distal end relative to the motor 254. Nipples 259 are secured within clamping plate 267. Hoses 260 and 262 are routed through a cavity 264 in the tool support arm 32 and terminate at fittings 266 and 268, respectively, in the tool support arm 32 near the dovetail 130. As the grinding tool head assembly 250 is lowered onto the dovetail 130 of the tool support arm 32, nipples 259 of the hoses 256 and 258 are received in fittings 266 and 268, respectively, to establish a pneumatic coupling between the motor 254 and the hoses 260 and 262. The lock screw 269 and plate 267 secure the grinding tool head assembly 250 to the tool support arm 32 and the nipples 259 within the fittings 266 and 268.

The hoses 260 and 262 are affixed to the turning bar 20 at an area 270 (FIG. 10) immediately above the tool support arm 32. The hose 260, carrying the intake air for the motor 254, is coupled through the wall of the turning bar 20 to a hose 272 longitudinally disposed within the bar 20, the hose 272 being coupled at an opposite end to the cap 210. The cap 210 includes an annular groove 274 coupled to the hose 272 by an airway 276 and is adapted to rotatably receive a sleeve 278 having a radial airway 279 which is coupled to an air source hose 280. The sleeve 276 and cap 210 form a rotary union for providing compressed air from the air source hose 280 through the airway 279 and into the groove 274 and airway 276 such that the compressed air is then communicated via the hoses 272, 260, and 256 to the motor 254. The exhaust from the motor 254, carried in the hose 262, is vented into the turning bar 20 at the connection of the hose 262 to the bar 20. The cap 210 is suitably provided with vents 284 to allow the air exhaust to escape from the turning bar 20. It is desirable to seal the turning bar 20 at its lower end with a cap 310, and also at rotational support points 286 for the rod 108, to insure that the motor exhaust exits the turning bar 20 only at the upper end. By venting the motor exhaust through the upper end of the turning bar 20, away from the work site, debris produced during the surfacing operation is not widely spread throughout the valve body 10.

The grinding tool head assembly 250 includes an engageable connection 290, similar to the connection 110 of the tool head assembly 34, which receives the rod 108 for radial positioning of the grinding wheel 256. Tool head 292 further includes a mortise 294 upon which the slidable tool head 296, including the motor 254, is radially slidable with respect to the axis 24 upon a dovetail 298. A carriage screw 300 is coupled to the connection 290, rotatably disposed with respect to the tool head 292, and threadably engaged with the slidable tool head 296 such that rotation of the carriage screw 300 by the rod 108 effects radial movement of the motor 254 and grinding wheel 255 with respect to the central axis 24.

The surfacing machine is provided with additional components for purposes of versatile operation. Cap 310 (FIG. 6), threaded within a lower end of the turning bar 20, is removed to allow attachment of an extension bar 312 (FIG. 13) which is threadable within the lower end of the turning bar 20. The extension bar 312 is identical in cross section to turning bar 20 and is rotatably supported by the chuck 28. The extension bar 312 facilitates mounting of the lower support chuck 28 below the tool support arm 32 such that the tool support arm 32 is intermediate the support chucks 26 and 28. Additionally, a tubular standoff 314 is bolted externally of the valve body 10 to permit the upper support chuck 26 to be mounted therein and positioned outside the valve body 10 for operation of the tool head assembly 34 close to an upper edge 316 of the valve body 10.

The tool head assemblies 34 and 250 are easily mounted and dismounted on the tool support arm 32 even when they are deep within the valve body 10 and out of the operator's reach. Extension socket tool 320 (FIG. 14) is of sufficient length to reach deep within the valve body 10 and has a socket 321 adapted to perform several tasks such as rotate the lock screws 136 and 269 to mount and dismount the tool head assemblies 34 and 250, turn the nuts 50 to radially position the legs 30 of chucks 26 and 28, turn the nut 124 to engage and disengage the rod 108 within the connections 110 and 290 to permit mounting and dismounting of the tool head assemblies 34 and 250, and adjust the lugs 74 to lock and unlock the chucks 26 and 28 on the turning bar 20. Extension screw tool 322 (FIG. 15) is also capable of reaching deep within the valve body 10 and has a threaded end 323 for threaded engagement with threaded apertures in the tool head assemblies 34 and 250, e.g., aperture 324 shown in FIG. 11, in order to lower or raise the tool head assemblies 34 and 250 to and from the tool support arm 32 while the machine is mounted within the valve body 10.

Figure 5:
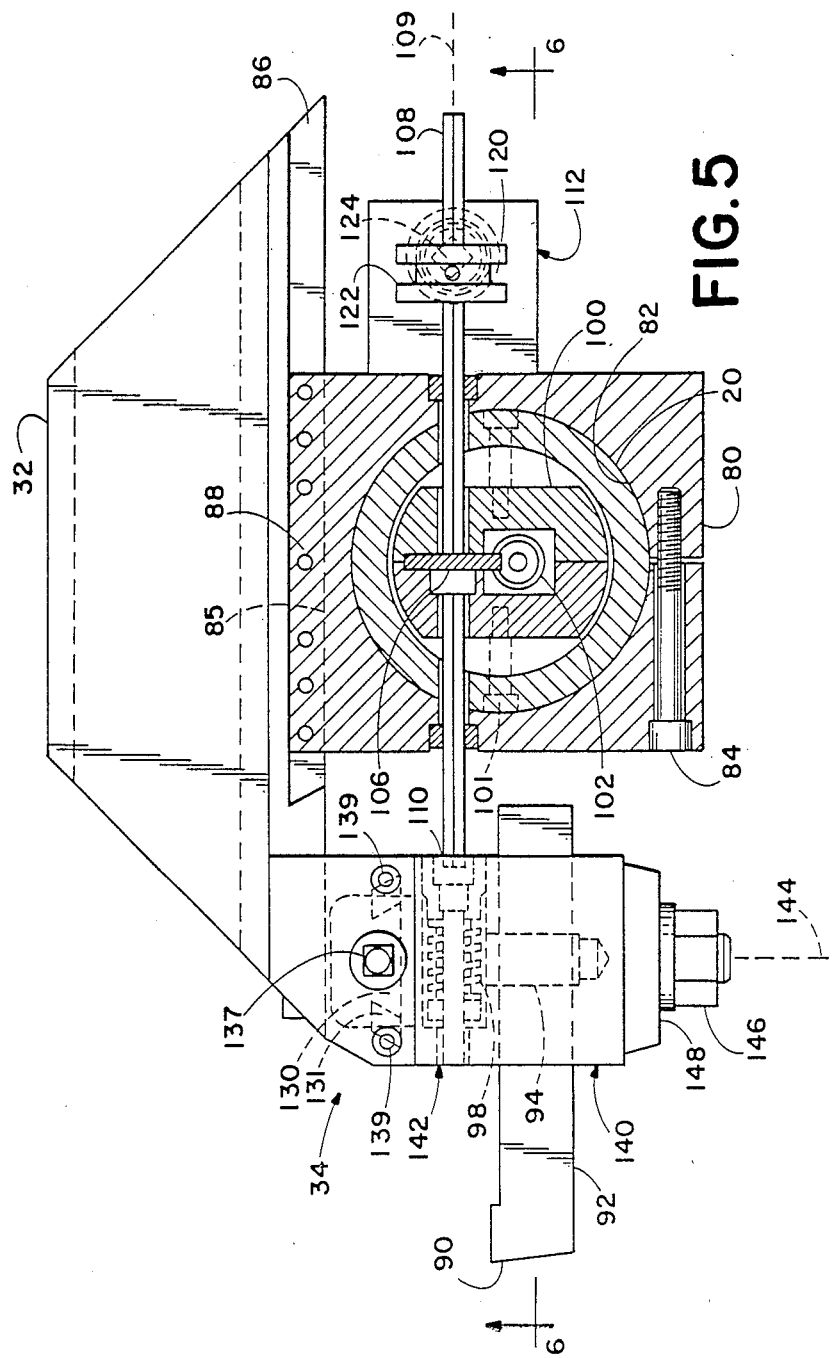
FIGS. 5 and 6 are sectional views illustrating a tool support arm and tool head assembly utilized in the machine of FIG. 1.
Figure 6:
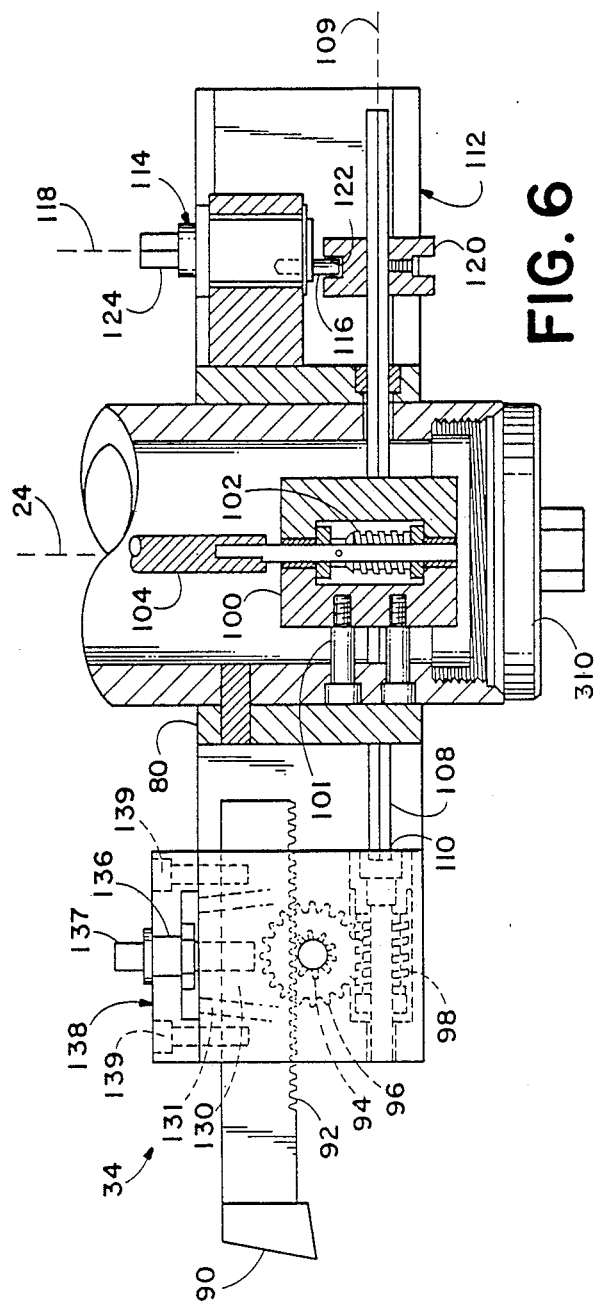
Figure 12:
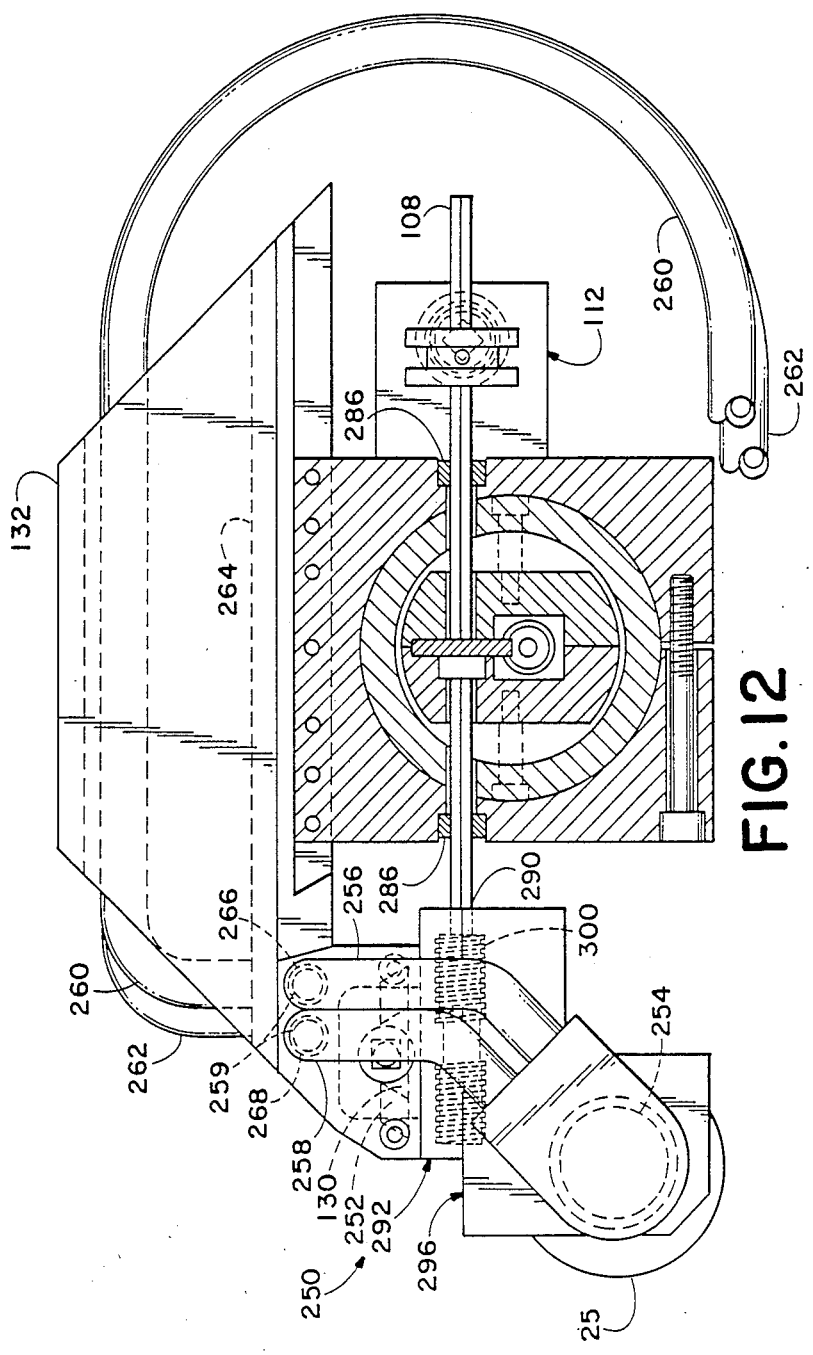

The hoses 260 and 262 shown in FIGS. 10, 11, and 12 have not been shown in FIGS. 5 and 6 for purposes of clarity; however, it is understood that these hoses remain attached to the surfacing machine. The clamping plate 138 (FIGS. 5 and 6) is provided with plugs (not shown) for insertion into the fittings 266 and 268 (FIGS. 11 and 12) for sealing the fittings 266 and 268 during cutting operations.

To install and operate the surfacing machine, the support chucks 26 and 28 are locked to the turning bar 20 by tightening the lugs 74. The chucks 26 and 28 should be positioned such that the machine is stable and generally aligned for insertion in the valve body 10 when hoisted at a lifting point on the tubular support 190. The gauges 54 are all reset when the legs are extended to a common predetermined distance from axis 24. The machine is then placed in the valve body 10 and the legs 30 are extended to contact the valve body and secure the support chucks 26 and 28 therein, the gauges 54 being used to position the central axis 24 of the turning bar 20 relative to the valve body 10. The lugs 74 are loosened to allow rotational and axial movement of the turning bar about and along the central axis 24. The tool head assembly 34 may be axially positioned, by operation of the motor 172, adjacent to the area to be surfaced. Activation of the motor 168 causes the tool head to rotate about the axis 24. By holding the radial feed nut 214 against rotation while the turning bar rotates, the tool 90 is fed radially outward at a constant feed rate. In this manner, a cutting operation is performed.

Once the cutting operation is complete, the tool head assembly 34 is removed from the tool support arm 32. An operator uses the extension tool 320 to first access the nut 124 to slide the rod 108 out of the connection 110 and then to rotate the lock screw 136 to release the tool head assembly 34 from the tool support arm 32 whereupon the tool 322 is used to lift the tool head assembly 34 from the tool support arm and remove it from the valve body 10. The grinding tool head assembly 250 is then lowered onto the tool support arm 32 using the tool 322 and the nipples 259 are received in the fittings 266 and 268. The extension tool 320 is then used to rotate the lock screw 269, to secure the grinding tool head assembly 250 on the tool support arm 32, and to rotate the nut 124, to engage the rod 108 in the connection 290 to permit radial feeding of the grinding tool head assembly 250.

By providing the turning bar with rotational and axial movement relative to the support chucks and by placing the drive mechanism externally of the valve body 10, it is possible for an operator to see clearly the work site and, more importantly, provides the operator with access to the work site. There is no need to dismount the surfacing machine to exchange tool head assemblies, and as a result less material is removed from the valve body and less time is required to surface the valve body. Further, by eliminating the inner race for the bearing arrangement, a turning bar of larger diameter may be used which contributes greatly to the rigidity of the surfacing machine and the accuracy of its operation. Finally, because the support chucks and the drive mechanism are adjustable in position along the length of the turning bar, the surfacing machine is adaptable to many types of valve bodies without a need for special mounting surfaces, and adaptable to many types of surfacing operations including refinishing pressure seal bores and surfacing guide ribs of large steam isolation valves.

It will be appreciated that the present invention is not restricted to the particular embodiment that has been described and illustrated, and that variations may be made therein without departing from the scope of the invention as defined in the appended claims and equivalents thereof.

I claim:

1. A machine for surfacing a workpiece, the machine comprising:
    a cylindric turning bar having an external surface of circular cross section defining a central axis;
    support means bearing against said external surface for rotatably supporting the turning bar while allowing axial movement of the turning bar;
    drive means including motor means positionable upon said turning bar for rotating said turning bar about its central axis; and
    means for holding said drive means against rotational movement relative to the central axis.

2. A machine according to claim 1, wherein said machine further comprises:
    means for axial postioning of said turning bar relative to the support means.

3. A machine according to claim 1, further comprising a tool support arm affixed to said turning bar for holding a tool radially spaced from the central axis.

4. A machine according to claim 1, wherein said means for holding said drive means comprises:
    a first peg affixed to said rotational drive means and disposed transversely to a plane containing the central axis;
    a second peg affixed to said rotational drive means, disposed transversely to the plane containing the central axis, and spaced from said first peg; and
    a guide member coupled to said support means, a portion of said guide member being held between said first and second pegs while being movable with respect to the first and second pegs in a direction parallel to the central axis.

5. A machine for surfacing a workpiece, the machine comprising:
    a central bar having a central axis; and
    support means for supporting the bar relative to the workpiece, said support means comprising:
        legs radially extendable relative to the central axis; and
        at least one gauge means coupled to at least one of said legs for measuring a radial position of said one leg relative to the central axis.

6. A machine for surfacing a workpiece, the machine comprising:

a central bar having a central axis; and
support means for supporting the bar relative to the workpiece, said support means comprising:
  legs for contacting the workpiece;
  separate radial adjustment means coupled to each of said legs for independent radial positioning of each of said legs relative to the central axis; and
  separate gauge means coupled to each of said legs for measuring a radial position of each leg relative to the central axis.

7. A machine mountable within a workpiece for surfacing the workpiece, the machine comprising:
  a tool support arm adapted to receive a tool head assembly;
  means for accessing the tool support arm when the machine is mounted within the workpiece to mount and dismount a tool head assembly; and
  means for carrying a tool head assembly to and from said tool support arm when the machine is mounted within the workpiece.

8. A machine according to claim 7, wherein said means for carrying comprises an elongate carrying tool including means for attachment of said carrying tool to said tool head assembly.

9. A machine mountable within a workpiece for surfacing the workpiece, the machine comprising:
  a tool head assembly;
  a tool support arm adapted to receive the tool head assembly;
  means for accessing the tool support arm when the machine is mounted within the workpiece to mount and dismount the tool head assembly; and
  means for carrying the tool head assembly to and from said tool support arm when the machine is mounted within the workpiece.

10. A machine according to claim 9, wherein said tool head assembly includes mounting means and said means for accessing comprises an elongate access tool for operating said mounting means.

11. A machine mountable within a workpiece for surfacing the workpiece, the machine comprising:
  a plurality of tool head assemblies;
  a tool support arm adapted to receive any selected one of the tool head assemblies;
  means for accessing the tool support arm when the machine is mounted within the workpiece to mount and dismount the selected tool head assembly; and
  means for carrying the selected tool head assembly to and from said tool support arm when the machine is mounted within the workpiece.

12. A machine according to claim 11, wherein one of the tool head assemblies is a fluid operated tool head assembly.

13. A machine according to claim 11, wherein one of the tool head assemblies is a pneumatic tool head assembly and a pneumatic connection between the pneumatic tool head assembly and said tool support arm is achieved as said tool support arm receives the pneumatic tool head assembly.

14. A machine mountable within a workpiece for surfacing the workpiece, the machine comprising:
  a tubular turning bar having a central axis;
  support means for rotatably supporting the turning bar relative to the workpiece while maintaining said central axis stationary relative to the workpiece;
  a tool support arm mountable on said turning bar and adapted to receive a tool head assembly; and
  radial feed means routed through said turning bar and adapted to be coupled to the tool head assembly for radial feeding thereof relative to the central axis, said radial feed means including a rotatable radial feed rod lying within the turning bar and extending substantially the length of the turning bar, and including means for coupling the radial feed rod to the tool head such that rotation of the radial feed rod relative to the turning bar causes radial feeding of the tool head.

15. A machine according to claim 14 wherein the radial feed means further comprises
  a radial feed nut connected to said radial feed rod and positioned externally of the turning bar.

16. A machine mountable within a workpiece for surfacing the workpiece, the machine comprising:
  a tubular turning bar having a central axis;
  support means for rotatably supporting the turning bar relative to the workpiece;
  a tool support arm mountable on said turning bar and adapted to receive a tool head assembly;
  a radial feed rod rotatably disposed longitudinally within the turning bar;
  a radial feed nut connected to said radial feed rod and positioned externally of the turning bar;
  a worm rotatably disposed longitudinally within said turning bar and coupled to said radial feed rod;
  a worm gear meshed with said worm; and
  a connection rod for coupling said worm gear to the tool head such that rotation of said radial feed rod causes rotation of said connection rod.

17. A machine according to claim 16, wherein said connection rod is slidable within said worm gear, said connection rod is slidably engageable with the tool head, and the machine further comprises means for sliding said connection rod in and out of engagement with the tool head.

18. A machine for surfacing a workpiece, the machine comprising:
  a cylindric turning bar having an external surface of circular cross section defining a central axis;
  support means bearing against said external surface for rotatably supporting said turning bar relative to the workpiece;
  a tool support arm mountable on said turning bar and adapted to receive a tool head assembly having a motor thereon;
  a rotary union mountable on said turning bar and adapted for coupling to a power source for said motor; and
  a power connection routed through said turning bar for coupling said rotary union and the motor.

19. A machine according to claim 18, wherein said support means permits axial movement of said turning bar and said rotary union is held against axial movement relative to said turning bar.

20. A machine according to claim 18, wherein said motor is a pneumatic motor, said source of power is a source of compressed air, and said power connection is an air hose.

21. A machine for surfacing a workpiece, the machine comprising:
  a turning bar having a central axis;
  a tool support arm mountable to said turning bar; and
  a tool head assembly comprising a first portion mountable to said tool support arm and a second portion for carrying a tool, the second portion being rotatable relative to the first portion about an axis transverse to a plane containing the central axis.

22. A machine according to claim 21, wherein said turning bar is tubular and the machine further comprises:
   radial feed means routed through said turning bar and coupled to the first portion of said tool head assembly for radial positioning of a tool carried by the second portion of said tool head assembly.

23. A machine for surfacing a workpiece, the machine comprising:
   a tubular turning bar having a central axis;
   support means for rotatably supporting said turning bar relative to the workpiece;
   a tool support arm mountable on said turning bar and adapted to receive a tool head assembly having a pneumatic motor thereon, said pneumatic motor having an air exhaust hose coupled to said turning bar for venting exhaust from said pneumatic motor into said turning bar;
   a rotary union mountable on said turning bar and adapted for coupling of compressed air to said motor; and
   an air hose routed through said turning bar for coupling said rotary union and the motor.

24. A machine for surfacing a workpiece, the machine comprising:
   a cylindric turning bar having an external surface of circular cross section defining a central axis;
   support means bearing against said external surface for rotatably supporting the turning bar while allowing axial movement of the turning bar;
   drive means positionable upon said turning bar for rotating said turning bar about its central axis;
   means for holding said drive means against rotational movement relative to the central axis;
   a threaded bar threadably coupled with one of said support means and said drive means, and held against axial movement relative to the other of said support means and said drive means; and
   means for rotating said threaded bar for axial positioning of said turning bar relative to said support means.

* * * * *

UNITED STATES PATENT AND TRADEMARK OFFICE
CERTIFICATE OF CORRECTION

PATENT NO. : 4,842,452

DATED : June 27, 1989

INVENTOR(S) : David S. Strait

It is certified that error appears in the above-identified patent and that said Letters Patent is hereby corrected as shown below:

Column 2, line 32, delete "18" and substitute --10--;

line 61, delete "3oa" and substitute --30a--; and line 67, delete "309a" and substitute --30a--.

Column 3, line 54, delete "With" and substitute --with--.

Column 12, line 2, after "coupling" insert --a source--.

Signed and Sealed this

Seventeenth Day of April, 1990

Attest:

HARRY F. MANBECK, JR.

*Attesting Officer*

*Commissioner of Patents and Trademarks*